United States Patent
Brown et al.

(10) Patent No.: US 11,383,340 B2
(45) Date of Patent: Jul. 12, 2022

(54) DEVICE FOR THE EXTRACTION OF MACHINING DUST

(71) Applicant: Nikken Kosakusho Europe Limited, South Yorkshire (GB)

(72) Inventors: Adam Brown, South Yorkshire (GB); Rowan Easter-Robinson, Derbyshire (GB); Nathan Ray, Rotherham (GB)

(73) Assignee: NIKKEN KOSAKUSHO EUROPE LIMITED

( * ) Notice: Subject to any disclaimer, the term of this patent is extended or adjusted under 35 U.S.C. 154(b) by 85 days.

(21) Appl. No.: 16/482,339

(22) PCT Filed: Feb. 5, 2018

(86) PCT No.: PCT/EP2018/052832
§ 371 (c)(1),
(2) Date: Jul. 31, 2019

(87) PCT Pub. No.: WO2018/141972
PCT Pub. Date: Aug. 9, 2018

(65) Prior Publication Data
US 2020/0047226 A1    Feb. 13, 2020

(30) Foreign Application Priority Data
Feb. 3, 2017  (GB) ..................... 1701823

(51) Int. Cl.
*B23Q 11/00*        (2006.01)
(52) U.S. Cl.
CPC ...... *B23Q 11/0046* (2013.01); *B23C 2230/08* (2013.01); *Y10T 409/304088* (2015.01)

(58) Field of Classification Search
CPC ......... Y10T 409/304088; Y10T 408/50; B08B 15/04; B23Q 11/0042; B23Q 11/0046;
(Continued)

(56) References Cited

U.S. PATENT DOCUMENTS 2,041,689 A  *  5/1936  Baumeister ........... E21B 21/015
175/135
2,246,916 A  *  6/1941  Fischer .............. B23Q 11/0046
408/56

(Continued)

FOREIGN PATENT DOCUMENTS

DE          3734127 A   *  4/1989
DE          4313658 C1  *  6/1994  ......... B23Q 11/0046

(Continued)

*Primary Examiner* — Ryan Rufo
(74) *Attorney, Agent, or Firm* — Clark Hill PLC; James R. Foley (57) ABSTRACT

The present invention provides a device (10) for the extraction of machining dust. The device (10) comprises a body (12) configured to be coupled to a section of a machining machine. The body (12) having a first opening (11) at a first end thereof and a second opening (13) at a second end thereof. The first end is opposite the second end, and the first opening (11) is configured to receive a tool holder therethrough and the second opening (13) configured to receive a cutting tool therethrough. The device also comprises a Venturi mechanism (14) connected to the body (12) and in fluid communication with said second opening (13). The Venturi mechanism (14) is configured to facilitate the suction of machining dust through the second opening (13) and through the Venturi mechanism (14).

15 Claims, 11 Drawing Sheets

(58) Field of Classification Search
CPC ... B23Q 11/005; B23Q 11/0071; B24B 55/06; B24B 55/10; B24B 55/102; B28D 7/02; E21B 21/015; B23C 2230/08
See application file for complete search history.

(56) References Cited

U.S. PATENT DOCUMENTS

| | | | |
|---|---|---|---|
| 2,339,324 A | | 1/1944 | Fischer |
| 2,990,024 A | * | 6/1961 | Van Allsburg ........ E21B 21/015 175/211 |
| 3,022,806 A | * | 2/1962 | Johnston ............ B23Q 11/0046 144/252.1 |
| 3,167,260 A | * | 1/1965 | Gibbons ............ B23Q 11/0046 241/56 |
| 3,442,337 A | * | 5/1969 | Astrom ............. B23Q 11/0042 173/61 |
| 3,638,737 A | * | 2/1972 | Moates ............. B23Q 11/0046 173/60 |
| 4,036,308 A | | 7/1977 | Delenberg |
| 4,037,982 A | * | 7/1977 | Clement ............. B23Q 11/006 408/61 |
| 4,184,226 A | * | 1/1980 | Loevenich ........ B23Q 11/0046 15/339 |
| 4,200,417 A | * | 4/1980 | Hager ................ B23Q 11/0046 144/251.2 |
| 4,361,957 A | * | 12/1982 | Krotz ...................... B08B 15/04 227/156 |
| 4,563,115 A | * | 1/1986 | Abe ................. B23Q 11/0046 408/241 G |
| 4,915,550 A | * | 4/1990 | Arai ...................... B23Q 3/069 408/56 |
| 5,017,060 A | * | 5/1991 | Shiratori ............... B23C 5/2269 407/1 |
| 5,026,221 A | * | 6/1991 | Arai ...................... B23Q 3/069 407/115 |
| 5,467,835 A | * | 11/1995 | Obermeier ......... B23Q 11/0046 175/209 |
| 5,474,116 A | * | 12/1995 | Shoda ............... B23Q 11/0046 144/252.1 |
| D392,531 S | * | 3/1998 | Richardson ..................... D8/70 |
| 5,919,010 A | * | 7/1999 | Fonseca ................ B23B 51/044 408/61 |
| 5,919,012 A | * | 7/1999 | Nakagawa ................ B23C 1/00 409/132 |
| 5,947,661 A | * | 9/1999 | Sugata ................ B23Q 1/0036 409/131 |
| 5,983,445 A | * | 11/1999 | Baker ...................... B08B 15/04 144/252.1 |
| 6,036,412 A | * | 3/2000 | Dalia ................ B23Q 11/1069 409/136 |
| 6,394,940 B1 | * | 5/2002 | Sugata ............... B23Q 11/0046 408/61 |
| 6,851,898 B2 | * | 2/2005 | Ege .................... B23Q 11/0046 408/241 S |
| 6,854,937 B1 | * | 2/2005 | Weiss ................. B23Q 11/0046 144/136.95 |
| 7,396,193 B2 | * | 7/2008 | Kesten ............... B23Q 11/0046 408/67 |
| 8,186,453 B2 | * | 5/2012 | Furusawa .......... B23Q 11/0046 173/197 |
| 9,221,142 B2 | * | 12/2015 | Nelson ............... B23Q 11/0046 |
| 9,452,502 B1 | * | 9/2016 | Jones ...................... B23B 47/34 |
| 9,579,762 B2 | * | 2/2017 | Sullivan .................... B25F 3/00 |
| 9,937,599 B1 | * | 4/2018 | Holleman .......... B23Q 11/0046 |
| 9,969,043 B2 | * | 5/2018 | Bergman ............. B23B 45/003 |
| 2004/0191011 A1 | | 9/2004 | Kamphius |
| 2005/0000052 A1 | * | 1/2005 | Byles ...................... B08B 15/04 15/314 |
| 2005/0019122 A1 | * | 1/2005 | Kado .................. B23Q 11/0046 409/137 |
| 2005/0105975 A1 | * | 5/2005 | Wood ................. B23Q 11/0046 408/1 R |
| 2005/0286983 A1 | * | 12/2005 | Janson .................... B23B 47/34 408/67 |
| 2006/0019585 A1 | * | 1/2006 | Zayat ...................... B24B 55/10 451/344 |
| 2007/0193759 A1 | * | 8/2007 | Sweig ................ B23Q 11/0046 173/198 |
| 2013/0330144 A1 | * | 12/2013 | Eickens ............. B23Q 11/0042 409/137 |
| 2014/0027139 A1 | * | 1/2014 | Hideta ............... B23Q 11/0046 173/198 |
| 2018/0161948 A1 | * | 6/2018 | Brigolin ..................... B23C 5/16 |

FOREIGN PATENT DOCUMENTS

| | | | | |
|---|---|---|---|---|
| DE | 19500215 C1 | * | 5/1996 | ............ B08B 15/04 |
| DE | 102004008101 A1 | * | 9/2005 | ............ B08B 15/04 |
| DE | 20 2008 009720 U1 | | 9/2008 | |
| EP | 2145710 B1 | | 1/2010 | |
| FR | 2861618 A1 | * | 5/2005 | ............ B23Q 3/157 |
| GB | 425736 A | | 3/1935 | |
| JP | 56102452 A | * | 8/1981 | ........ B23Q 11/0046 |
| JP | S56102452 A | | 8/1981 | |
| JP | 2003072294 A | * | 3/2003 | |
| SU | 1214340 A | * | 2/1986 | |
| SU | 1565646 A | * | 5/1990 | |

* cited by examiner

DEVICE FOR THE EXTRACTION OF MACHINING DUST

FIELD OF THE INVENTION

The present invention relates to a device for the extraction of machining dust, in particular, for the extraction of composite dust particles. The present invention also relates to a milling machine tool holder assembly.

BACKGROUND OF THE INVENTION

A machining process, for example milling, drilling, trimming etc., is usually employed to an article in a number of industries to get the article in a state suitable for its intended use.

Such processes involve controlled material removal by means of a cutting tool. Material waste, for example dust particles, is generated during the machining process which if not removed from the vicinity of the material extraction point can lead to flaws in the finished article and/or damage to the cutting tool.

A known method for the removal of material waste is by means of a cooling fluid which also acts as a medium for regulating the working temperature of the cutting tool. In some applications, the use of a cooling fluid is undesirable as the cooling fluid would alter the characteristics of the work piece.

Another method for the removal of material waste is by means of a dust extractor incorporating a fan or impeller, coupled to the machine. However such systems, especially for industrial sized work, require a lot of floor space in addition to the space for the machining equipment. In addition, such systems are not suitable for the extraction of large fragments of material waste.

For composite machine operations, machining dust is both an irritant raising health and safety issues but also abrasive, causing wear to spindles and guideways. Additionally it is electrically conductive and has the potential to short out systems.

These issues prevent machining of composites on existing standard equipment, requiring the purchase of bespoke machining platforms having integral extraction and sealed mechanical and electrical systems. This can be a very expensive purchase especially if a project requiring the machining of composites is a one-off or such projects are few and far between.

There is therefore a need for a simplified means for the removal of composite material waste which does not alter the characteristics of a work piece and/or require a lot of floor space to install.

In addition, there is a need for a device which allows existing equipment to be adapted for use for the machining of composite materials.

SUMMARY OF THE INVENTION

According to a first aspect, there is provided a device for the extraction of machining dust comprising:
a body configured to be coupled to a section of a machining machine, said body having a first opening at a first end thereof and a second opening at a second end thereof, the first end being opposite the second end, said first opening configured to receive a tool holder therethrough when said body is coupled to a section of a machining machine and said second opening configured to receive a cutting tool therethrough when said body is coupled to said section of a machining machine; and
a Venturi mechanism connected to the body and in fluid communication with said second opening;
wherein said Venturi mechanism is configured to facilitate the suction of machining dust through the second opening between said body and a cutting tool, and through the Venturi mechanism.

The present invention provides a simplified means for the removal of material waste which does not alter the characteristics of a work piece and/or require a lot of floor space to install.

The present invention also provides a means for adapting existing machining equipment for composite material applications.

The present invention also comprises no moving parts. As such, it is easier and cheaper to manufacture than dust extractor attachments which incorporate fans or impellers to assist in the removal of machining dust from the vicinity of the material extraction point. In addition, large fragments can be extracted without damage to the device as it does not comprise any moving parts.

Preferably, the Venturi mechanism is a Venturi pump.

In exemplary embodiments, the Venturi mechanism defines an aspirator pump type mechanism.

Preferably, the body comprises a central portion and the Venturi mechanism is connected to the body at the central portion.

In exemplary embodiments, the central portion is substantially shaped like a conical frustum.

In exemplary embodiments, the central portion is substantially cylindrical in shape.

An advantage of having the central portion substantially shaped like a conical frustum or a cylinder is that it facilitates the creation of a vortex within the body when the device is in use, thus assisting the extraction of machining dust.

The central portion is preferably made from a rigid material. In exemplary embodiments, the central portion is made from a metallic material, for example aluminium, stainless steel etc.

Conveniently, the body comprises a connector portion configured to couple the device to a section of a machining machine, and the first opening forms part of the connector portion. Preferably, the connector portion is configured to couple the device directly to the section of the machining machine.

In exemplary embodiments, the first opening is substantially circular and is of similar size to the section of the machining machine to which it is to be attached.

Preferably, the device further comprises a hose clamp for facilitating the coupling of the connector portion of the device to the section of the machining machine.

The hose clamp may be in any suitable form. In exemplary embodiment, the hose clamp is in the form of a worm drive hose clip.

The connector portion is preferably made from a rigid material. In exemplary embodiments, the connector portion is made from a metallic material, for example aluminium, stainless steel etc.

The connector portion may be manufactured by any suitable means, for example by a fabrication process, a casting process or an additive manufacturing (3D printing) process.

In exemplary embodiments, the connector portion substantially comprises a 3D printable material.

By having the connector portion substantially of 3D printable material, it can be easily produced onsite and bespoke to the equipment the device is to be used with.

In exemplary embodiments, the connector portion is releasably connected to the central portion.

Having the connector portion releasably connected to the central portion means that the connector portion can be easily replaced should it become faulty. In addition, it improves the versatility of the device as it can be utilised for different equipment by changing the connector portion as required to match the equipment the device is to be used with.

The connector portion may be releasably connected to the central portion by any suitable means. In exemplary embodiments, the connector portion is releasably connected to central portion by means of a snap-fit mechanism.

Instead of the connector portion being releasably connected to the central portion, the connector portion may be integrally formed with the central portion or permanently joined to the central portion.

In exemplary embodiments, the connector portion is substantially cylindrical in shape.

Preferably, the body comprises a nozzle portion, and the second opening forms part of the nozzle portion.

The nozzle portion is preferably made from a rigid material. In exemplary embodiments, the nozzle portion is made from a metallic material, for example aluminium, stainless steel etc.

In exemplary embodiments, the nozzle portion substantially comprises a 3D printable material.

By having the nozzle portion substantially of 3D printable material, it can be easily produced onsite and bespoke to the cutting tool utilised for the machining process.

In exemplary embodiments, the nozzle portion is releasably connected to central portion.

Having the nozzle portion releasably connected to the central portion means that the nozzle portion can be easily replaced should it become faulty. In addition, it improves the versatility of the device as it can be utilised for different cutting tools by changing the nozzle portion as required to match the cutting tool for the machining process the device is to be used with.

The nozzle portion may be releasably connected to the central portion by any suitable means. In exemplary embodiments, the nozzle portion is releasably connected to central portion by means of releasable fasteners. The releasable fasteners may be a nut and bolt arrangement.

Instead of the nozzle portion being releasably connected to the central portion, the nozzle portion may be integrally formed with the central portion or permanently joined to the central portion.

Preferably, the nozzle portion is substantially dome shaped.

Having the nozzle portion substantially dome shaped facilitates the funneling of machining dust through the device.

In exemplary embodiments, the nozzle portion is substantially compound dome shaped.

According to a second aspect, there is provided a machining machine tool holder assembly comprising:
a tool holder, the tool holder comprising a first section having a cavity for receiving a tool therein and a second section configured to connect the tool holder assembly to a spindle of a machining machine;
a Venturi mechanism coupled to the first section of the tool holder via a bearing; and
a nozzle section coupled to the Venturi mechanism, the nozzle section having a first opening at a first end thereof and a second opening at a second end thereof, the first end being opposite the second end;
wherein said Venturi mechanism is in fluid communication with said second opening of the nozzle section and is configured to facilitate the suction of machining dust through said second opening into the nozzle section and through the Venturi mechanism, and
an end of the first section of the tool holder is housed within the nozzle section, and said second opening of the nozzle section is configured to receive a cutting tool therethrough.

Preferably, the tool holder assembly is a milling machine tool holder assembly.

Preferably, the tool holder further includes a mounting flange positioned between the first and second sections of the tool holder.

Preferably, the mounting flange further includes a radial groove thereon.

Preferably, the bearing is a high speed bearing.

The nozzle section is preferably made from a rigid material. In exemplary embodiments, the nozzle section is made from a metallic material, for example aluminium, stainless steel etc.

In exemplary embodiments, the nozzle section substantially comprises a 3D printable material.

By having the nozzle section substantially of 3D printable material, it can be easily produced onsite and bespoke to the cutting tool utilised for the machining process.

In exemplary embodiments, the nozzle section is releasably connected to the Venturi mechanism.

Having the nozzle section releasably connected to the Venturi mechanism means that the nozzle section can be easily replaced should it become faulty. In addition, it improves the versatility of the tool holder assembly as it can be utilised for different cutting tools compatible with the tool holder by changing the nozzle section as required to match the cutting tool for the machining process the tool holder assembly is to be used with.

The nozzle section may be releasably connected to the Venturi mechanism by any suitable means. In exemplary embodiments, the nozzle section is releasably connected to Venturi mechanism by means of a snap-fit mechanism.

Instead of the nozzle section being releasably connected to the Venturi mechanism, the nozzle section may be integrally formed with the Venturi mechanism or permanently joined to the Venturi mechanism.

Preferably, the nozzle section is substantially dome shaped.

Having the nozzle section substantially dome shaped facilitates the funneling of machining dust through the tool holder assembly.

In exemplary embodiments, the nozzle section is substantially compound dome shaped.

Other aspects are as set out in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILS DESCRIPTION OF THE EMBODIMENTS

There will now be described by way of example a specific mode contemplated by the inventors. In the following description numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description.

Referring to FIGS. 1 to 4, a first embodiment of a device 10 in accordance with a first aspect of the invention is shown. The device 10 is configured to facilitate the removal of machining dust from the vicinity of the material extraction point during a machining process.

The device 10 comprises a body 12 and a Venturi mechanism 14.

The body 10 includes a first opening 11 at a first end thereof and a second opening 13 at a second end thereof. The first end is opposite the second end.

The first opening 11 is configured to receive a tool holder 23 therethrough (see FIG. 4) and the second opening is configured to receive a cutting tool (not shown) therethrough. The body 10 acts as a cowling for the tool holder 23.

The body 10 is made up of three sections, a connector portion 15, a central portion 16 and a nozzle portion 17.

While in the embodiment shown, the connector portion 15, the central portion 16 and the nozzle portion 17 are separate components, it would be understood that adjacent sections of the body 10 may be integrally formed with one another.

The first opening 11 forms part of the connector portion 15 and the connector portion 15 is configured to couple the device 10 to a section (not shown) of a machining machine (not shown).

In the embodiment shown, the first opening 11 is substantially circular, although it would be understood that the first opening 11 may be of a different shape just as long as it corresponds in shape to the cross-sectional profile of the section of the machining machine to which it is to be attached.

The first opening 11 is of similar size to, but slightly wider than, the section of the machining machine to which it is to be attached.

The connector portion 15 is made of a rigid material, preferably a metallic material although it may be made from any suitable rigid material.

In exemplary configurations, the connector portion 15 is a 3D printed component. By having the connector portion 15 made from a 3D printable material, it can be easily produced onsite and bespoke to the equipment the device 10 is to be used with. This allows the device 10 to be easily fitted to any spindle/tool holder combination.

It would be understood that the connector portion 15 may be made from any manufacturing process. It is not necessary for it to be produced via a 3D printing process.

The connector portion 15 includes a plurality of grooves 151 cut into an upper part of the connector portion 15. The grooves 151 allow the upper part of the connector portion 15 to splay if required. This allows the connector portion 15 to be fitted to section of a machining machine having a cross sectional area the same size as the first opening 11 or slightly larger than the first opening 11.

The connector portion 15 is releasably connected to the central portion by means of a snap-fit mechanism 24. In the embodiment shown, the snap-fit mechanism 24 is in the form of an annular snap-fit joint, although it would be understood that the connector portion 15 may be releasably connected to the central portion 16 by any suitable means.

Having the connector portion 15 releasably connected to the central portion 16 means that the connector portion 16 can be easily replaced should it become faulty. In addition, it improves the versatility of the device 10 as it can be utilised for different equipment by changing the connector portion 15 as required to match the equipment the device 10 is to be used with.

The central portion 16 is substantially shaped like a conical frustum and is made from a rigid material, such as a metallic material. It would be understood that the central portion may be of a different shape, for example, the central portion may be substantially cylindrical in shape.

An advantage of having the central portion 16 substantially shaped like a conical frustum (or a cylinder) is that is facilitates the creation of a vortex within the body 12 when the device 10 is in use, thus assisting the extraction of machining dust.

Figure 3:
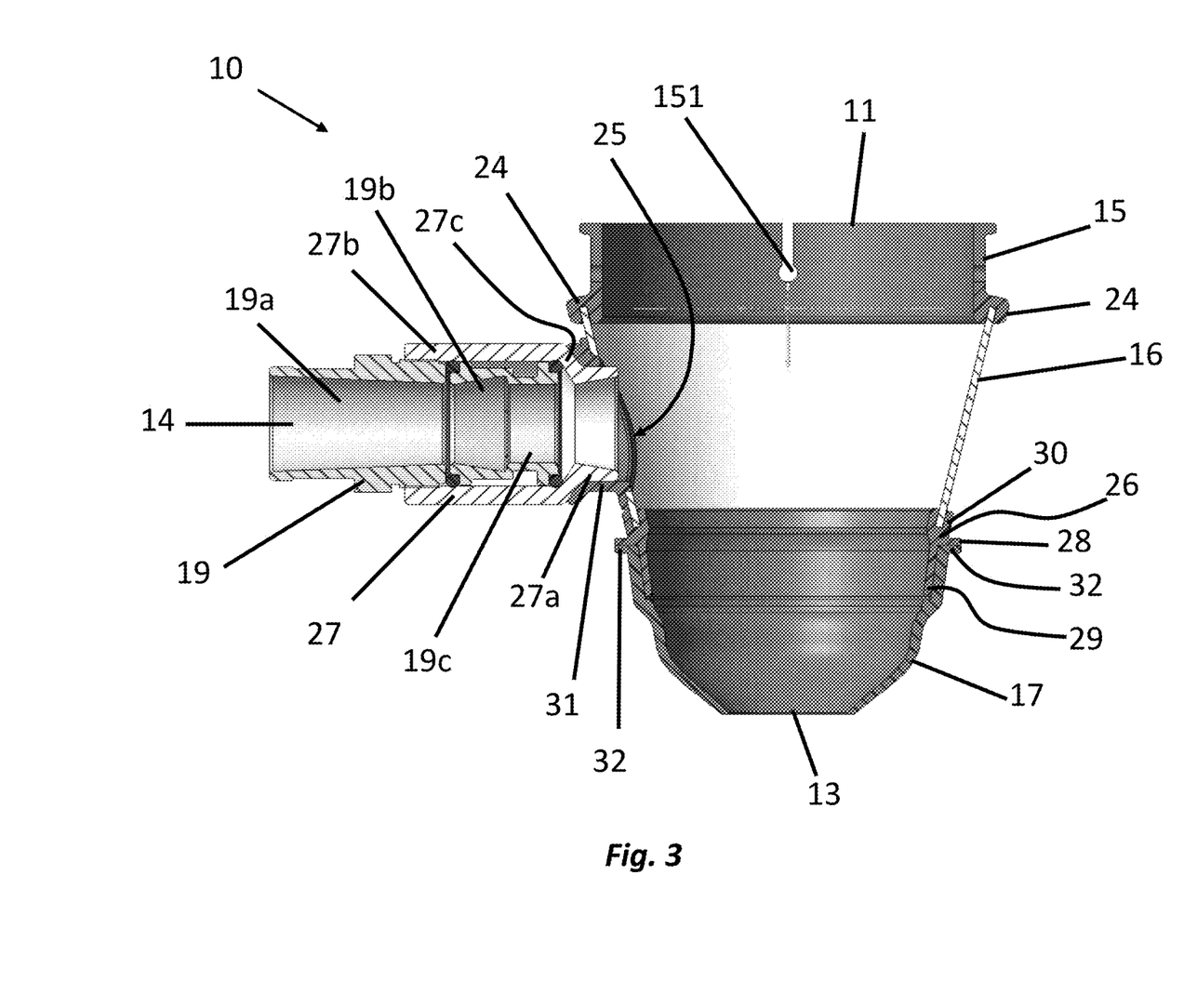
FIG. 3 is a cross-sectional view of the embodiment of FIG. 1.
Figure 4:
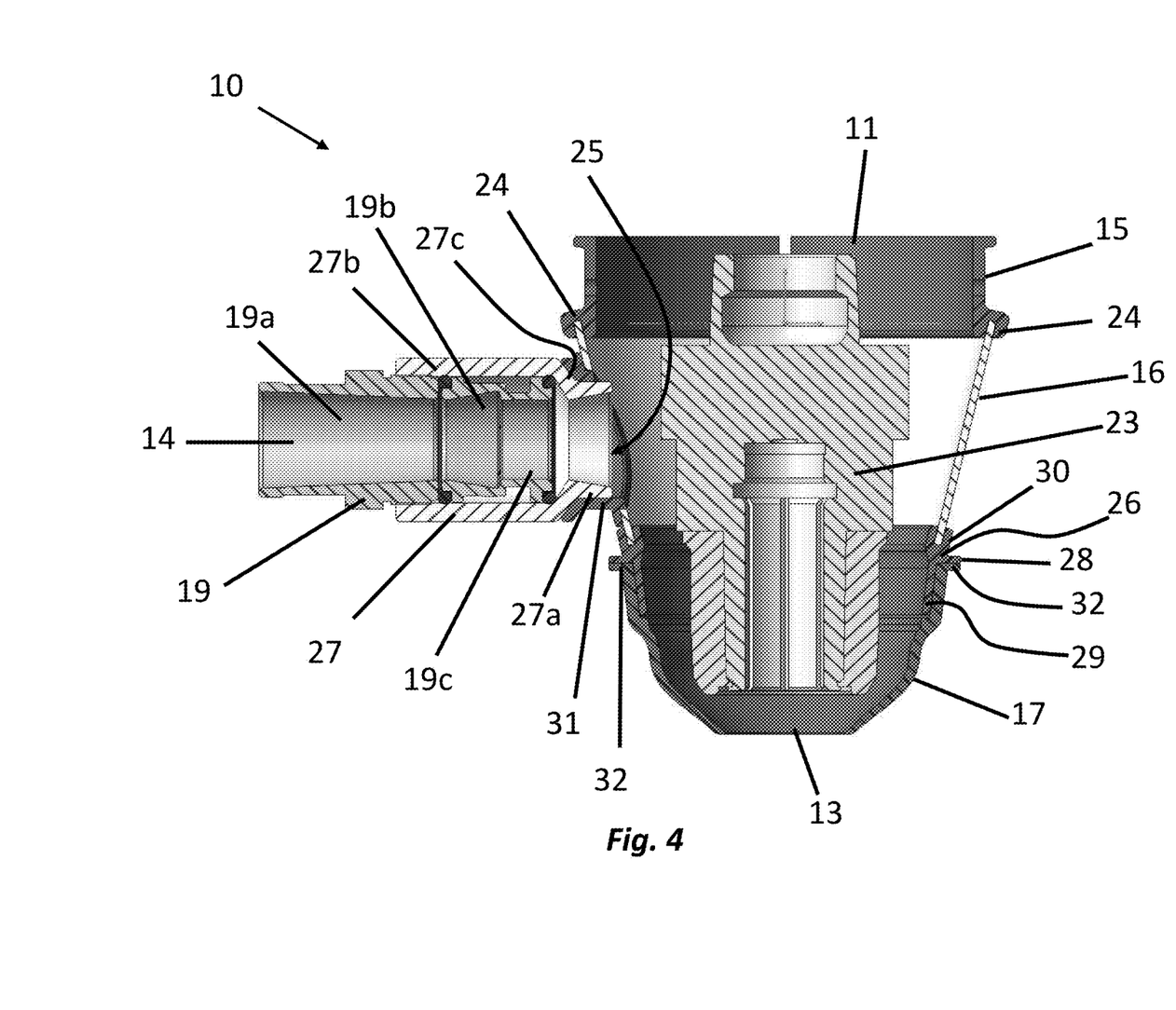
FIG. 4 is a cross-sectional view showing the positioning of the embodiment of FIG. 1 relative to a spindle of a machining machine.

A third opening 25 in the body 12 is provided on the central portion 16 (see FIG. 3). The third opening 25 provides a passage for the flow of machining dust entering the body 12 from the second opening 13 out of the body 12.

The device 10 includes an adapter 26 for facilitating the connection of the central portion 16 with the nozzle portion 17.

The adapter 26 incorporates a snap-fit mechanism 30 in the form an annular snap-fit joint for connecting the central portion 16 thereto. It would be understood that a different snap-fit arrangement may be utilised.

Figure 2:
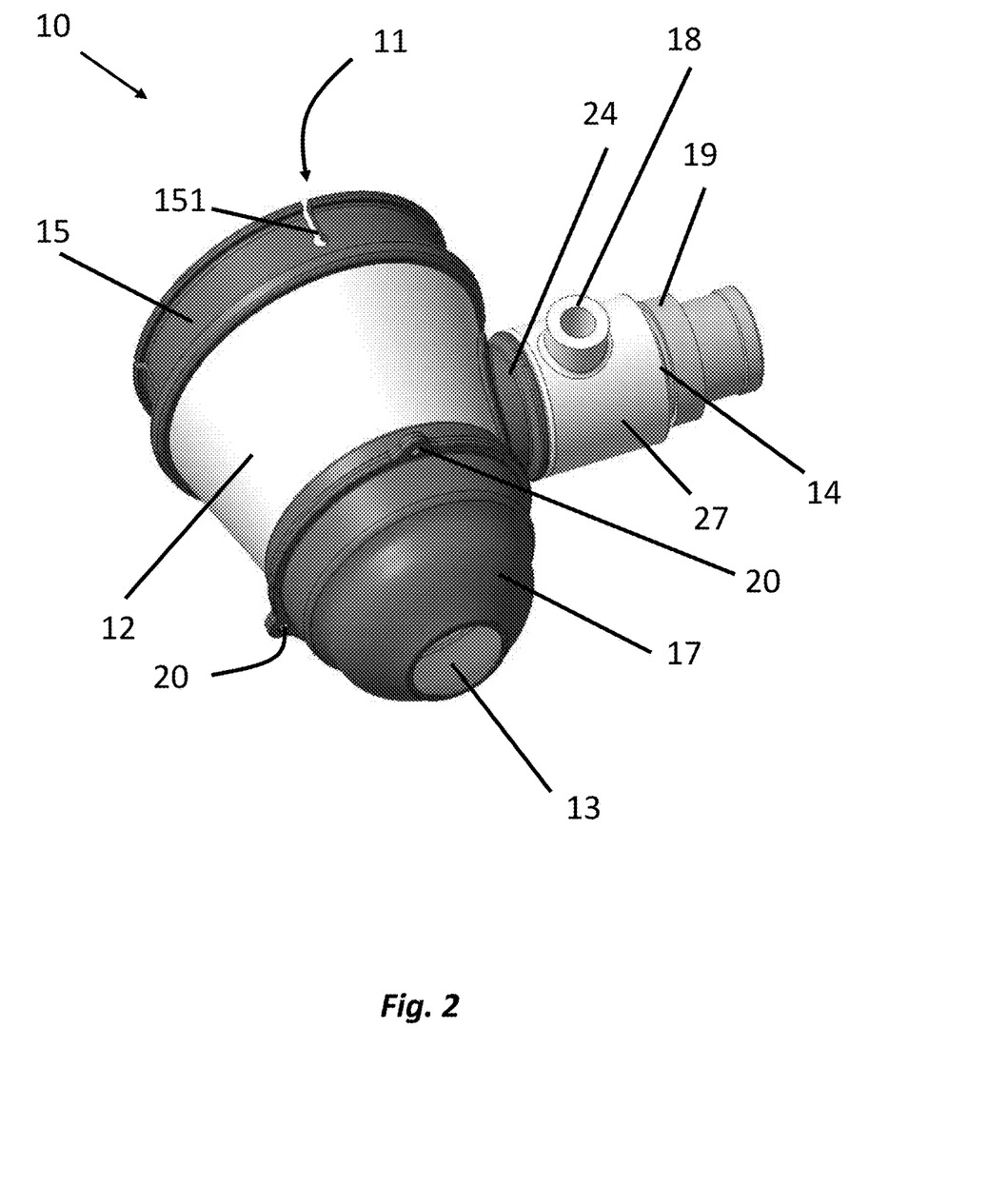
FIG. 2 is another schematic view of the embodiment of FIG. 1.

The adapter 26 includes a collar 29 which is configured to be housed within the nozzle portion 17, a spout 31 and an outwardly extending flange 28 (see FIG. 2).

The spout 31 is configured to align with the third opening 25.

In the embodiment shown, the adapter 26 is made of the same material as the connector portion 16, although a different material may be used for the adapter 26.

The second opening 13 forms part of the nozzle portion 17 and the nozzle portion 17 is formed of a rigid material, such as a metallic material. In exemplary configurations, the nozzle portion is made from a 3D printable material. In the embodiment shown, the nozzle portion 17 is formed from the same material as the connector portion 15, although it would be understood that it may be formed from a different material.

By having the nozzle portion 17 substantially of 3D printable material, it can be easily produced onsite and bespoke to the cutting tool utilised for the machining process. The nozzle portion 17 is sized for a required cutting tool stick out and/or fixture clearance.

The nozzle portion 17 includes an outwardly extending flange 32 which is arranged to mate with the flange 28 of the adapter 26.

The nozzle portion 17 is releasably connected to central portion 16 via the adapter 26 by means of releasable fasteners (not shown). In the embodiment shown, the nozzle portion 17 and the central portion 16 are configured to be releasably connected by releasable fasteners in the form a nut and bolt arrangement. A plurality of corresponding eyelets 20 are provided on the flanges 28, 32 for the bolts to pass through.

It would be understood that any suitable means may be utilised to releasably connect the adapter 26 to the nozzle portion 17.

Having the nozzle portion 17 releasably connected to the central portion 16 means that the nozzle portion 17 can be easily replaced should it become faulty. In addition, it improves the versatility of the device 10 as it can be utilised for different cutting tools by changing the nozzle portion 17 as required to match the cutting tool for the machining process the device 10 is to be used with. This provides a modular system that can be quickly adapted to any application. This is due to the fact that the nozzle portion can be manufactured for individual reach or access requirements.

The nozzle portion 17 is substantially dome shaped. This facilitates the funneling of machining dust through the device 10. In the embodiment shown, the nozzle portion is substantially a compound dome shaped.

The Venturi mechanism 14 is in the form of Venturi pump or an aspirator pump type mechanism, and has a main tube 19, a coupling 27 and a hose barb 18.

The coupling 27 is substantially bottle shaped and includes a neck section 27a, a cylindrical wall section 27b, and a shoulder section 27c (see FIG. 3).

The neck section 27a is configured to push fit within the spout 31 such that the Venturi mechanism 14 is connected to the body 12 at the central portion 16. The neck section 27a has an inner wall which tapers inwardly in a direction towards the shoulder section 27c of the coupling 27.

The shoulder section 27c is a sloped shoulder and connects the neck section 27a to the cylindrical wall section 27b.

The neck section 27a and the shoulder section 27c define a first constricted section within the Venturi mechanism 14 wherein the Venturi mechanism internally first narrows and then expands in cross-sectional area.

The main tube 19 is partially housed within the cylindrical wall section 27b of the coupling 27, and the main tube 19 internally defines a second constricted section within the Venturi mechanism 14 wherein the Venturi mechanism internally first narrows and then expands in cross-sectional area.

In the embodiment shown, the main tube 19 internally includes a first frustoconical area 19a, a second frustoconical area 19b and a cylindrical area 19c. The first and second frustoconical areas 19a, 19b are located adjacent to one another and each taper inwards. It would be understood that the main tube 19 may be of a different internal configuration.

Figure 1:
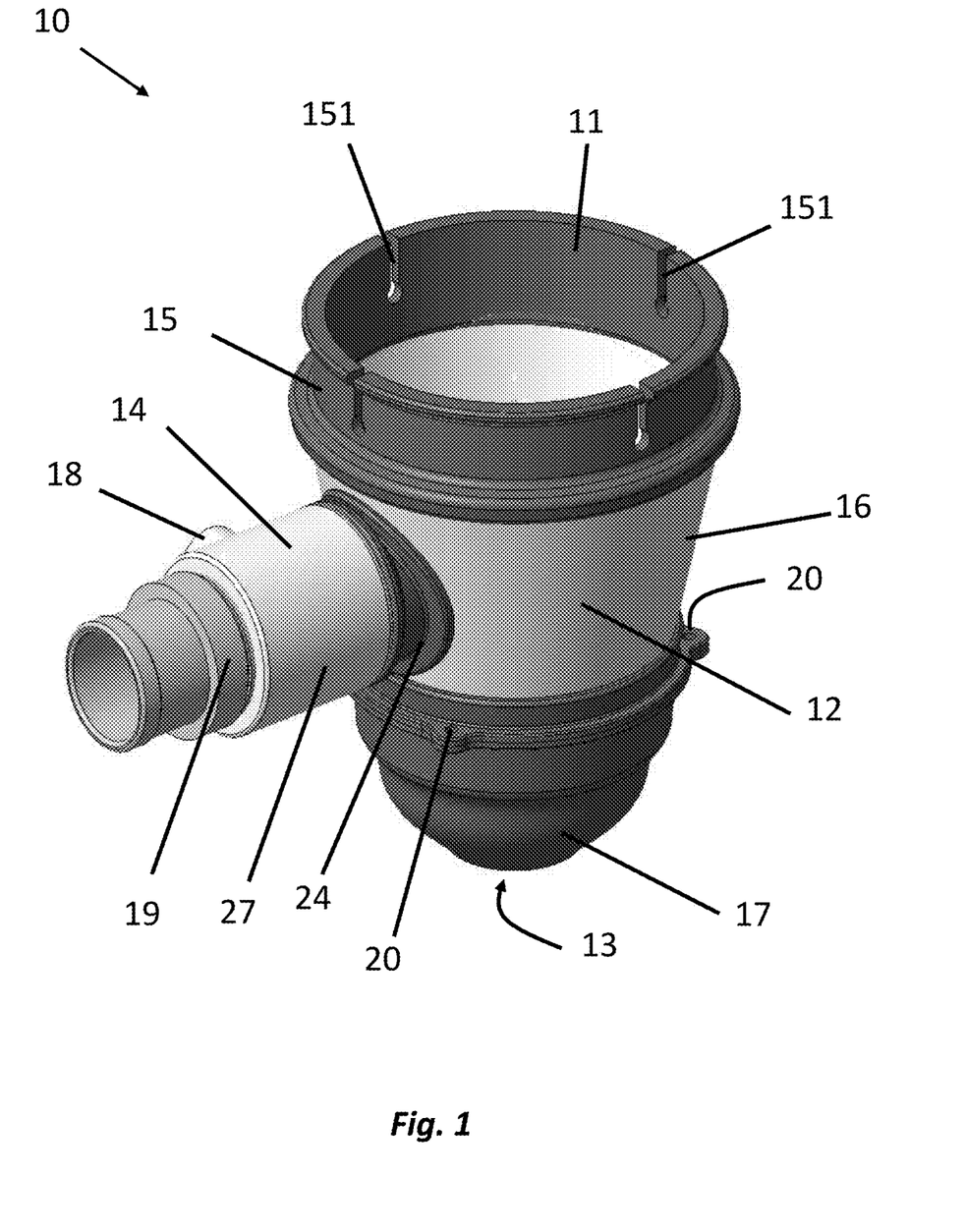
FIG. 1 is a schematic view of an embodiment of the device in accordance with an aspect of the invention.

The hose barb 18 is connected to the coupling 27 on the cylindrical wall section 27b of the coupling 27.

The Venturi mechanism 14 is in fluid communication with the second opening 13 via the third opening 25 and is configured to facilitate the suction of machining dust through the second opening and through the Venturi mechanism.

The free end of the main tube 19, and hence the Venturi mechanism 14, is configured to be connected to a waste collection system, for example to a filter bag or large volume extraction system.

The device 10 is driven by a standard compressor airline which is available on the majority of machining machines. The compressor airline is connected to the device 10 via the hose barb 18.

In use, compressed air is supplied via the compressor airline to the Venturi mechanism 14 via the hose barb 18. The air flow within the main tube 19 will be at such a high rate and speed that suction is generated, due to Bernoulli's principal, at the neck section 27a of the coupling 27 of the Venturi mechanism 14.

The suction generated pulls in fluid from the body 12 into the Venturi mechanism 14 and creates a partial vacuum at the second opening 13.

Due to the partial vacuum created, ambient air and together with machining dust from the vicinity of the material extraction point is sucked into the body 12 through the second opening 13 and into the Venturi mechanism 14 via the third opening 25.

The machining dust is thus transferred through the main tube 19 to the waste collection system.

The ingestion of ambient air into the body 14 has the additional benefit of acting as coolant and regulating the temperature of the cutting tool.

In addition, when the cutting tool spins at a high velocity during the material extraction process, a vortex will be created in the body 14 due to the shape of the body 14 which helps regulate the temperature of the cutting tool.

Figure 5:
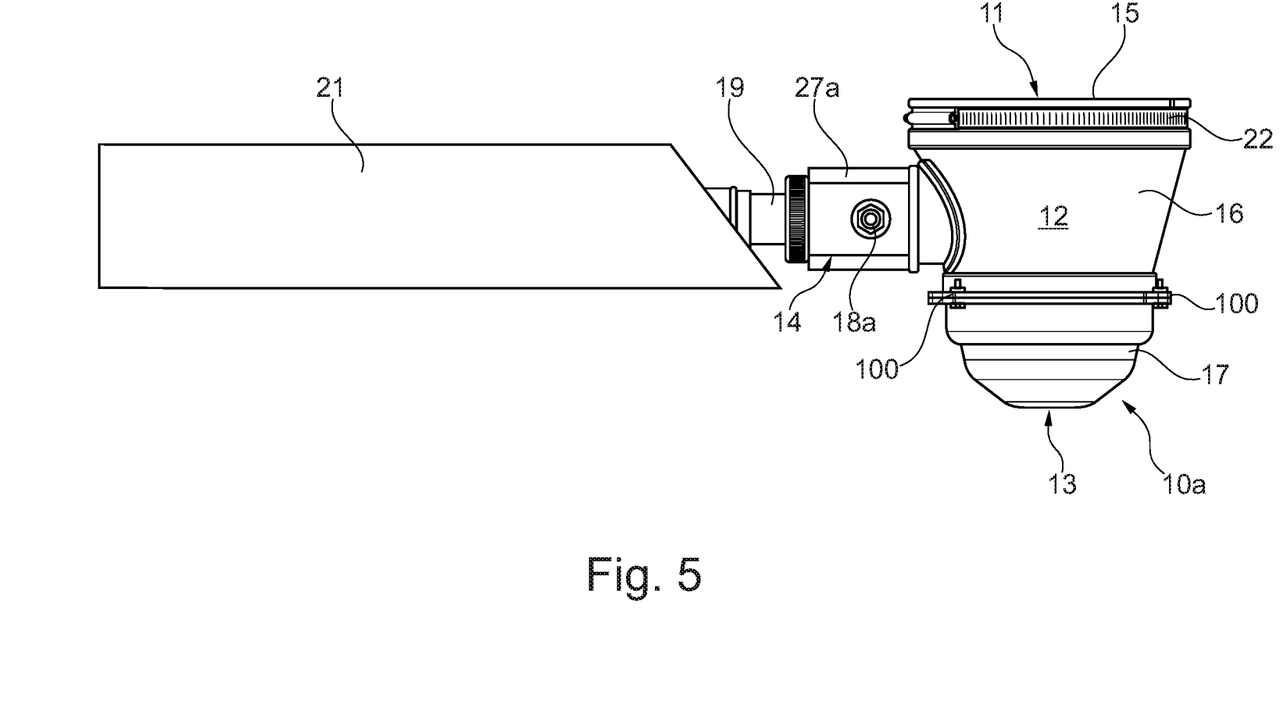
FIG. 5 is a schematic view of another embodiment of the device in accordance with the invention attached to a filter bag.

Referring to FIG. 5, a second embodiment of a device 10a in accordance with the first aspect of the invention is shown.

The device 10a of the second embodiment is very similar to the first embodiment and the same reference numerals have been used to identify identical features.

The device 10a of the second embodiment mainly differs from that of the first embodiment in relation to the direction the hose barb 18a extends from the coupling 27a. In one embodiment the hose barb extends outwardly from the left-hand side of the coupling and in the other embodiment, the hose barb extends outwardly from the right-hand side of the coupling.

The device 10a is shown connected to a waste collection system in the form of a filter bag 12.

A hose clamp 22 is provided on the connector portion 15 for facilitating the coupling of connector portion 15 to the section of the machining machine. In the embodiment shown, the hose clamp 22 is in the form of a worm drive hose clip, although it would be understood that the hose clamp may be in any suitable form.

A nut and bolt arrangement 100 is used to releasably couple the nozzle portion to central portion in the manner described earlier.

Figure 6:
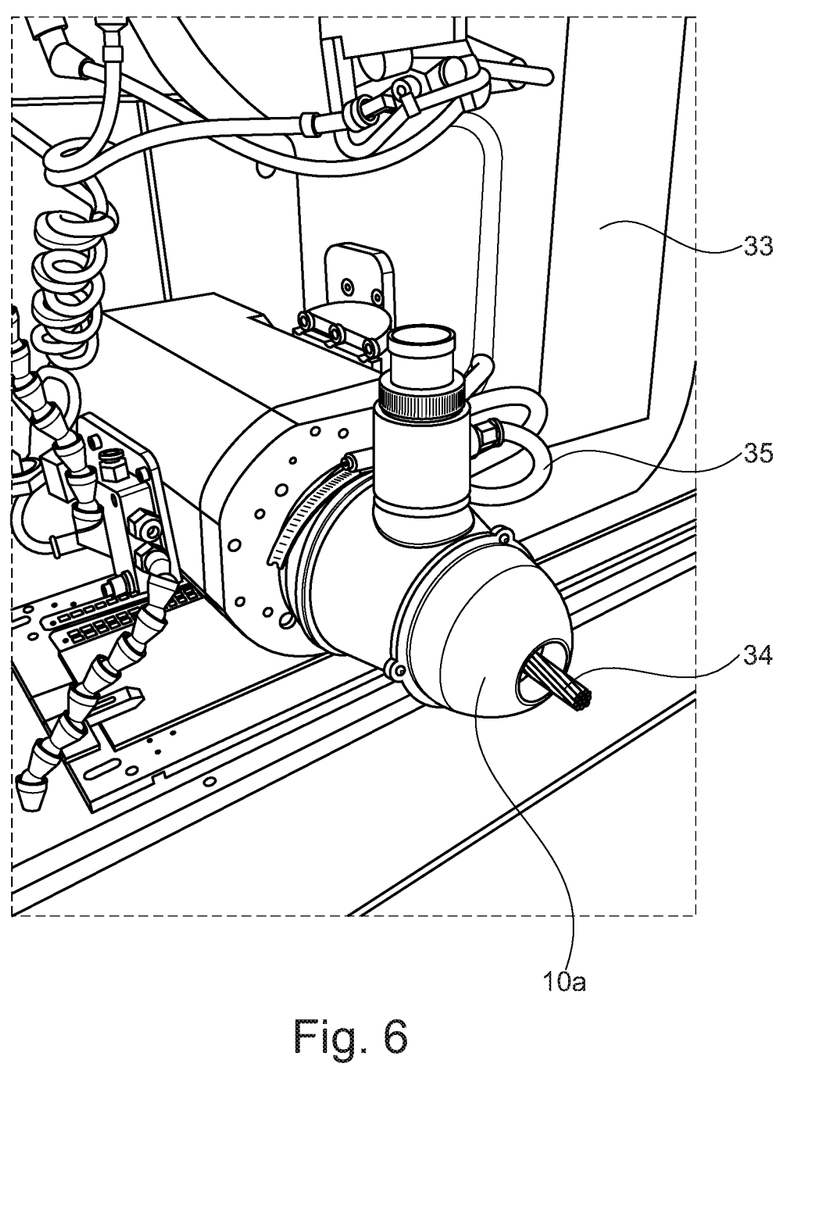
FIG. 6 shows the device of FIG. 5 attached to a milling machine.

FIG. 6 shows the device 10a of the invention attached to a machining machine in the form of a milling machine 33.

A compressor airline 35 is shown connected to the hose barb 18a and a cutting tool 34 is shown protruding through the second opening 13.

In use, machining dust generated by the cutting tool 34 will be sucked into the body of the device 10a through the second opening 13 before exiting the body 12 through the Venturi mechanism 14.

For milling, trimming and drilling processes, re-cutting of machining dust and excessive heat will prematurely wear the cutting tool. The large volume of air flow generated by the device in use, apart from the cooling effect, reduces and/or eliminates the need for manual process intervention to clean the cutting tool or replace the cutting tool due to premature wear.

Figure 7:
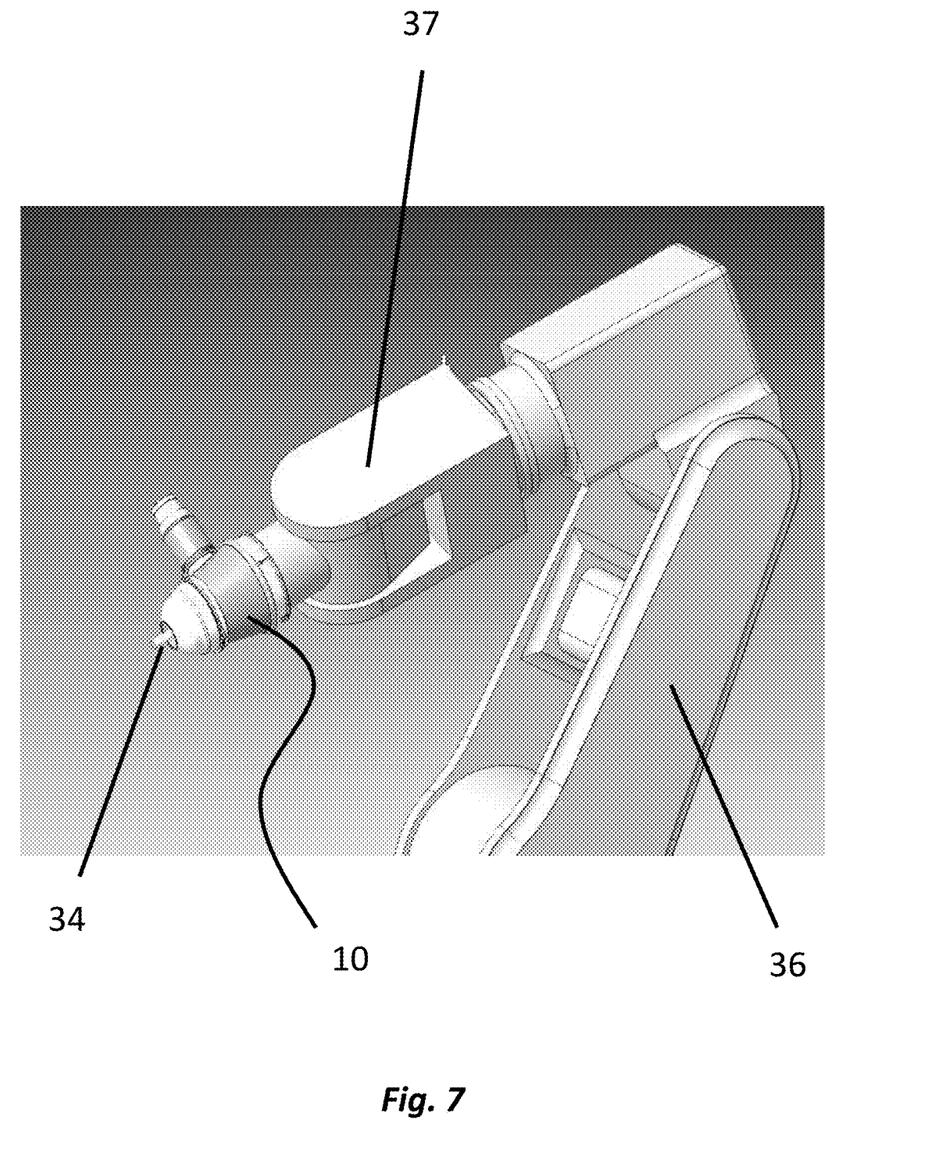
FIG. 7 shows the device of FIG. 1 attached to a machining robot.

FIG. 7 shows the device 10 of the invention attached to the arm 37 of a machining robot 36. A cutting tool 34 is shown protruding through the second opening 13. With the device 10, the need for the robotic machining of composite materials to be contained within a box/room to prevent contamination of the processes around it, and to prevent health and safety risks to an operator, will be negated. This provides a huge benefit in costs and space savings.

The device can be manually loaded to the spindle or supplied as part of an automated tool change assembly.

For automated tool change applications, the device in accordance with the first aspect of the invention is permanently attached to the tool holder about a flange of the tool holder. For such applications, the device is constructed from a metallic material for stiffness and strength.

The combined device and tool holder may be integrally formed or be constructed initially as separate components before being fixedly joined together.

Where the automatic tool changer (ATC) is unable to accommodate the size of the combined device and tool holder, a spindle attachment assembly may be utilized with the combined device and tool holder incorporated into the spindle attachment assembly, to facilitate automated tool changing.

The combined device and tool holder/spindle attachment assembly is configured to be compatible with standard ATC systems. Standard ATC systems use a stopper block on the spindle. The changeable tools generally include an anti-rotation spigot which is inserted into a cavity in the stopper block so as to allow an internal tool holder to be driven by the spindle of the machine while the outer casing of the tool remains stationary.

The standard ATC system for use with the combined device and tool holder/spindle attachment assembly of the invention is one which includes an air valve incorporated into the stop block as known in the art.

The air valve may be connected to a compressor airline for the supply of compressed air or any suitable air flow system as known in the art.

The device forming part of the combined device and tool holder/spindle attachment assembly differs from the previously described embodiments in that the hose barb rather than extending to the left or to the right from the coupling, extends upwards from the coupling and also acts as the anti-rotation spigot.

Figure 8:
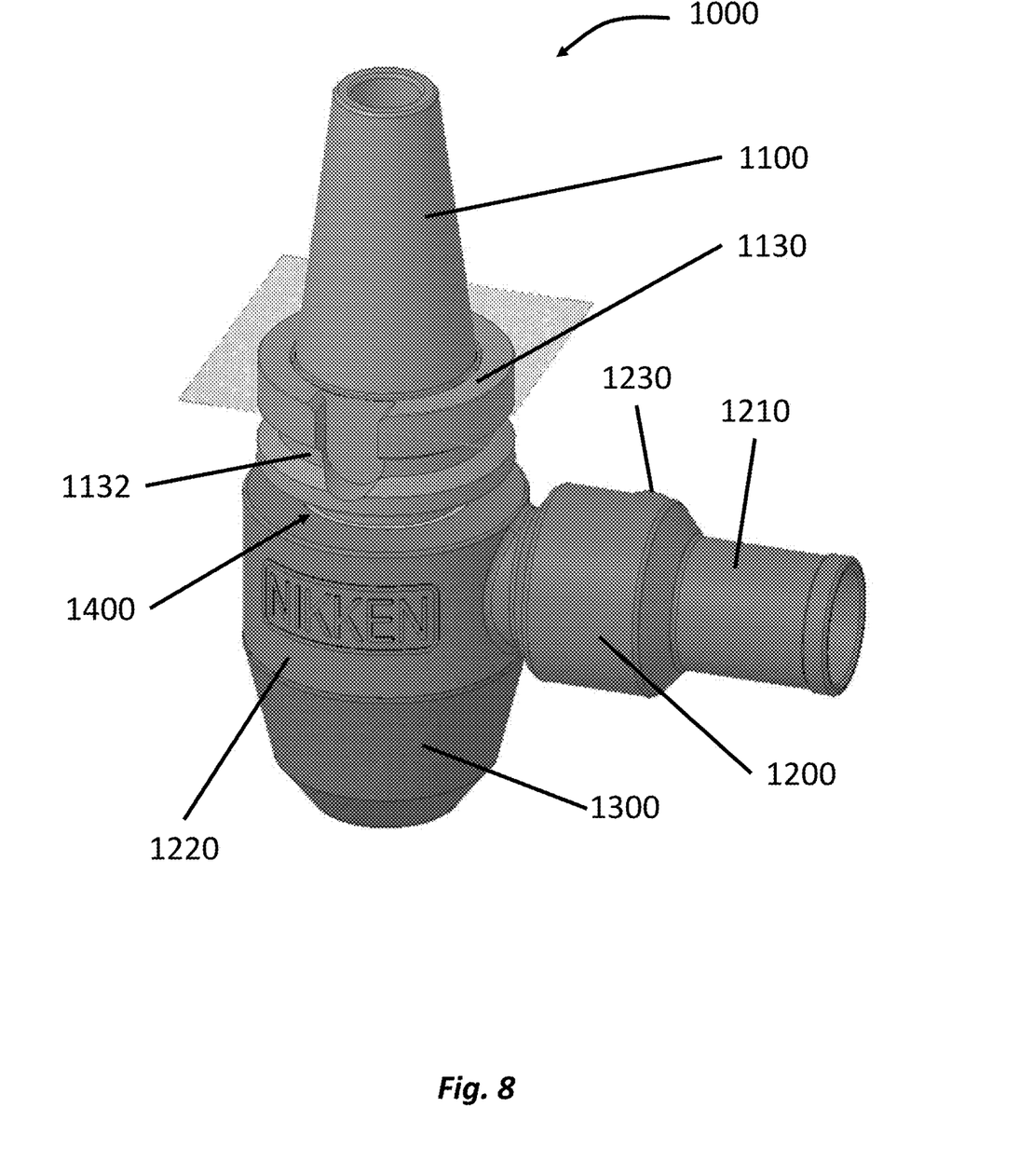
FIG. 8 is a schematic view of an embodiment of a machining machine tool holder assembly in accordance with an aspect of the invention.
Figure 9:
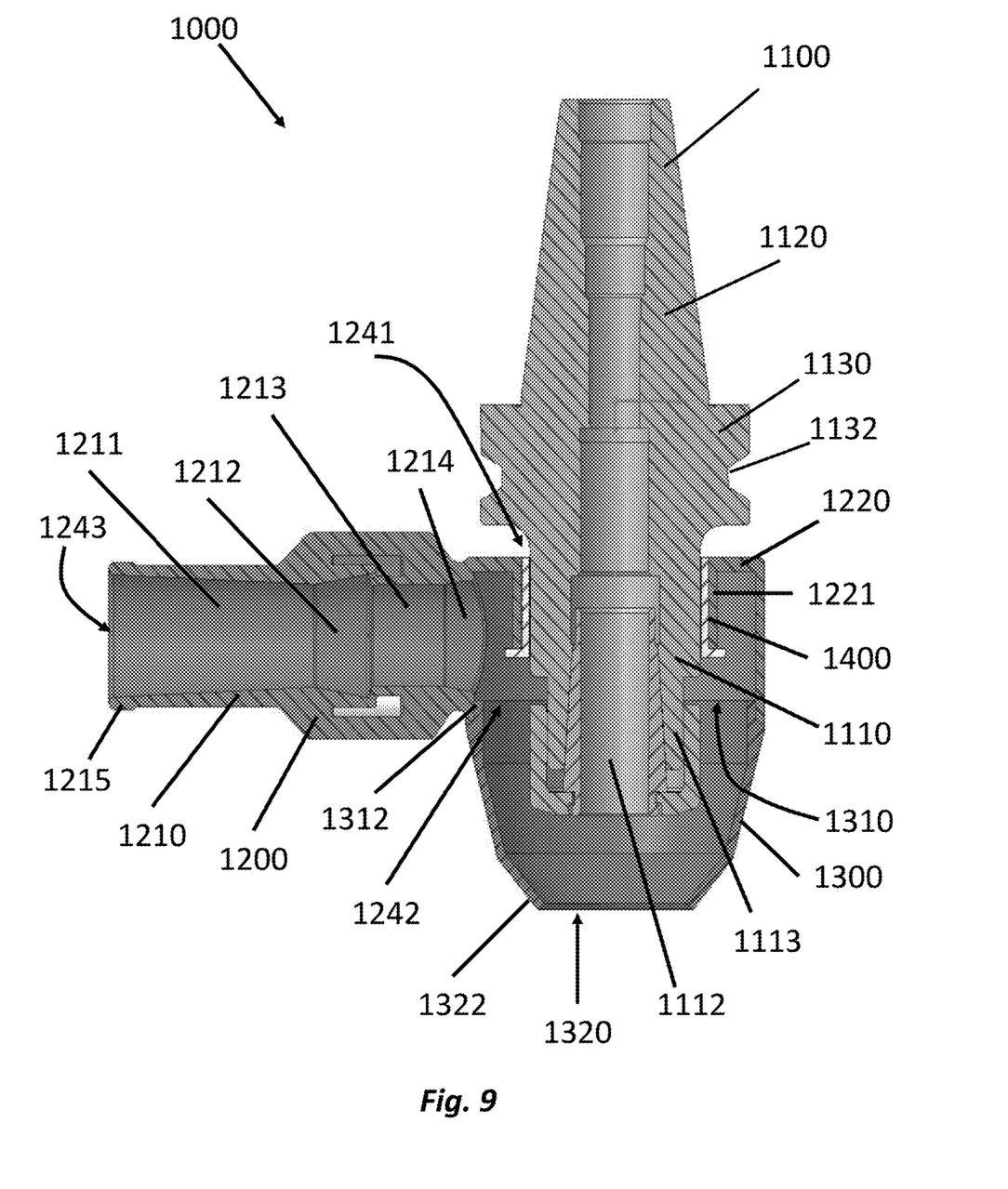
FIG. 9 is a cross-sectional view of the embodiment of FIG. 8.

Referring to FIGS. 8 and 9, an embodiment of a machining machine tool holder assembly 1000 in accordance with a second aspect of the invention is shown.

The tool holder assembly 1000 is designed for use with ATC systems and differs in construction to the combined device and tool holder embodiment described above.

The tool holder assembly 1000 comprises a tool holder 1100, a Venturi mechanism 1200, and a nozzle section 1300.

The tool holder 1100 portion of the tool holder assembly is of a similar design to a tool holder known in the art and will be configured for the machining machine, for example a milling machine, to which the tool holder assembly 1000 is to be used with.

The tool holder 1100 includes a first section 1110 having a cavity 1112 for receiving a tool therein i.e. a cutting tool, and a second section 1120 configured to connect the tool holder assembly 1000 to a spindle of a machining machine.

The tool holder 1100 further includes a mounting flange 1130 positioned between the first and second sections 1110, 1120 of the tool holder 1100.

In the embodiment shown, the second section 1120 of the tool holder 1100 is tapered and the mounting flange 1130 includes a radial groove 1132 thereon.

As known in the art, the second section 1120 is tapered at a desired angle to allow mounting of the tool holder assembly 1100 to specifically configured machining machines.

The Venturi mechanism 1200 is in the form of Venturi pump or an aspirator pump type mechanism, and has a tube section 1210, a hollow body section 1220 and a hose barb 1230 extending from the tube section 1210.

The tube section 1210 internally defines a constricted section within the Venturi mechanism 1200 wherein the Venturi mechanism internally first narrows and then expands in cross-sectional area.

In the embodiment shown, the tube section 1210 internally includes a first frustoconical area 1211, a second frustoconical area 1212, a cylindrical area 1213 and a third frustoconical area 1214. The first and second frustoconical areas 1211, 1212 are located adjacent to one another and each taper inwards. The third frustoconical area 1214 is located at an opposite end of the tube section 1210 to the first frustoconical area 1211, and the cylindrical area 1213 is located between the second frustoconical area 1212 and the third frustoconical area 1214. It would be understood that the tube section 1210 may be of a different internal configuration.

The body section 1220 is substantially cylindrical in shape and the tube section 1210 extends outwardly from the curved surface of the body section 1220.

The Venturi mechanism has a first opening 1241 on a first side of the body section 1220, a second opening 1242 on a second opposite side of the body section 1220, and a third opening 1243 on the free end 1215 of the tube section 1210.

The first opening is surrounded by an inwardly extending radial flange 1221 which acts a bearing support for a high speed bearing 1400.

The bearing 1400 is sized to fit around an area of the first section 1110 of the tool holder 1100 proximate the mounting flange 1130. In this way the Venturi mechanism is coupled to the first section 1110 of the tool holder 1100 via the bearing 1400. The bearing 1400 allows the tool holder 1100 to rotate independently of the Venturi mechanism 1200 and nozzle section 1300.

The free end 1215 of the tube section 1210 is configured to be connected to a waste collection system, for example to a filter bag or large volume extraction system, such that in use the third opening 1243 of the Venturi mechanism 1200 defines an exit for machining dust entering the tool holder assembly 1000.

The hose barb 1230 functions in a similar fashion to the previously described hose barbs.

The nozzle section 1300 includes a first opening 1310 at a first end 1312 thereof and a second opening 1320 at a second end 1322 thereof, the first end 1312 being opposite the second end 1322.

The nozzle section 1300 is formed of a rigid material, such as a metallic material. In exemplary configurations, the nozzle section 1300 is made from a 3D printable material.

By having the nozzle section 1300 substantially of 3D printable material, it can be easily produced onsite and bespoke to the cutting tool utilised for the machining process. The nozzle section 1300 is sized for a required cutting tool stick out and/or fixture clearance.

The nozzle section 1300 is releasably connected to the body section 1220 of the Venturi mechanism 1200 at the first end 1312 of the nozzle section 1300. In the embodiment shown, the nozzle section 1300 and the body section 1220 of the Venturi mechanism 1200 are configured to be releasably connected by a snap-fit mechanism. When connected together, the end 1113 of the first section 1110 of the tool holder 1100 is housed within the nozzle section 1300.

It would be understood that any suitable means may be utilised to releasably connect the nozzle section 1300 to the body section 1220 of the Venturi mechanism 1200.

Having the nozzle section 1300 releasably connected to the body section 1220 of the Venturi mechanism 1200 means that the nozzle section 1300 can be easily replaced should it become faulty. In addition, it improves the versatility of the tool holder assembly 1000 as it can be utilised for different cutting tools by changing the nozzle section 1300 as required to match the cutting tool for the machining process the tool holder assembly is to be used with, as well as for replacement of the cutting tool held by the tool holder 1100 of the tool holder assembly 1000. This provides a modular system that can be quickly adapted to any application. This is due to the fact that the nozzle section can be manufactured for individual reach or access requirements.

The nozzle section 1300 is substantially dome shaped. This facilitates the funneling of machining dust in through the nozzle section 1300 and out of through the third opening 1243 in the free end 1215 of the Venturi mechanism 1200. In the embodiment shown, the nozzle section 1300 is substantially a compound dome shaped.

Figure 10:
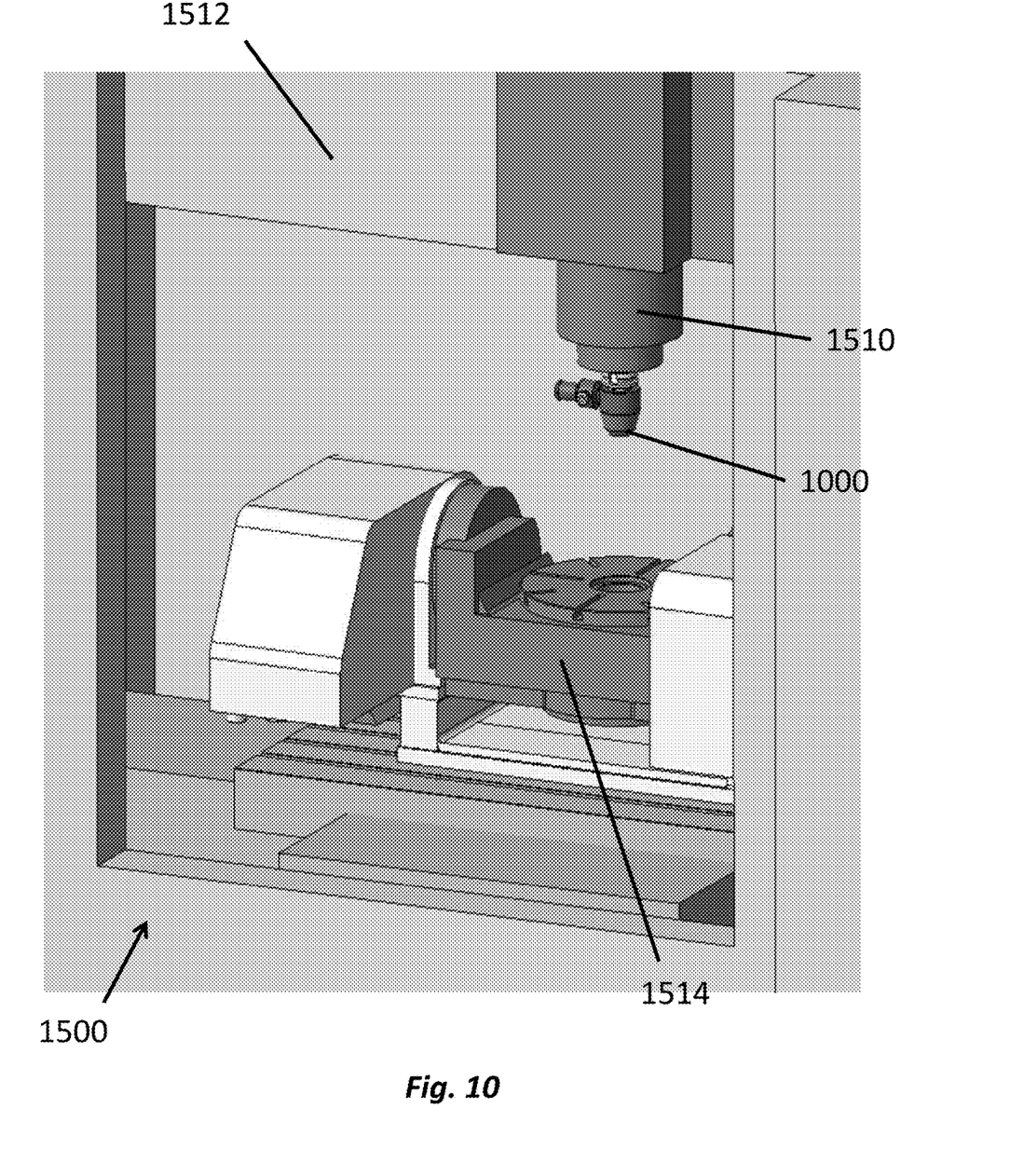
FIG. 10 shows a milling station incorporating the tool holder assembly of FIG. 8.

FIG. 10 shows the tool holder assembly 1000 in accordance with the invention connected to a spindle 1510 of a milling machine 1512 forming part of a milling station 1500 which also includes rotary table 1514.

Figure 11:
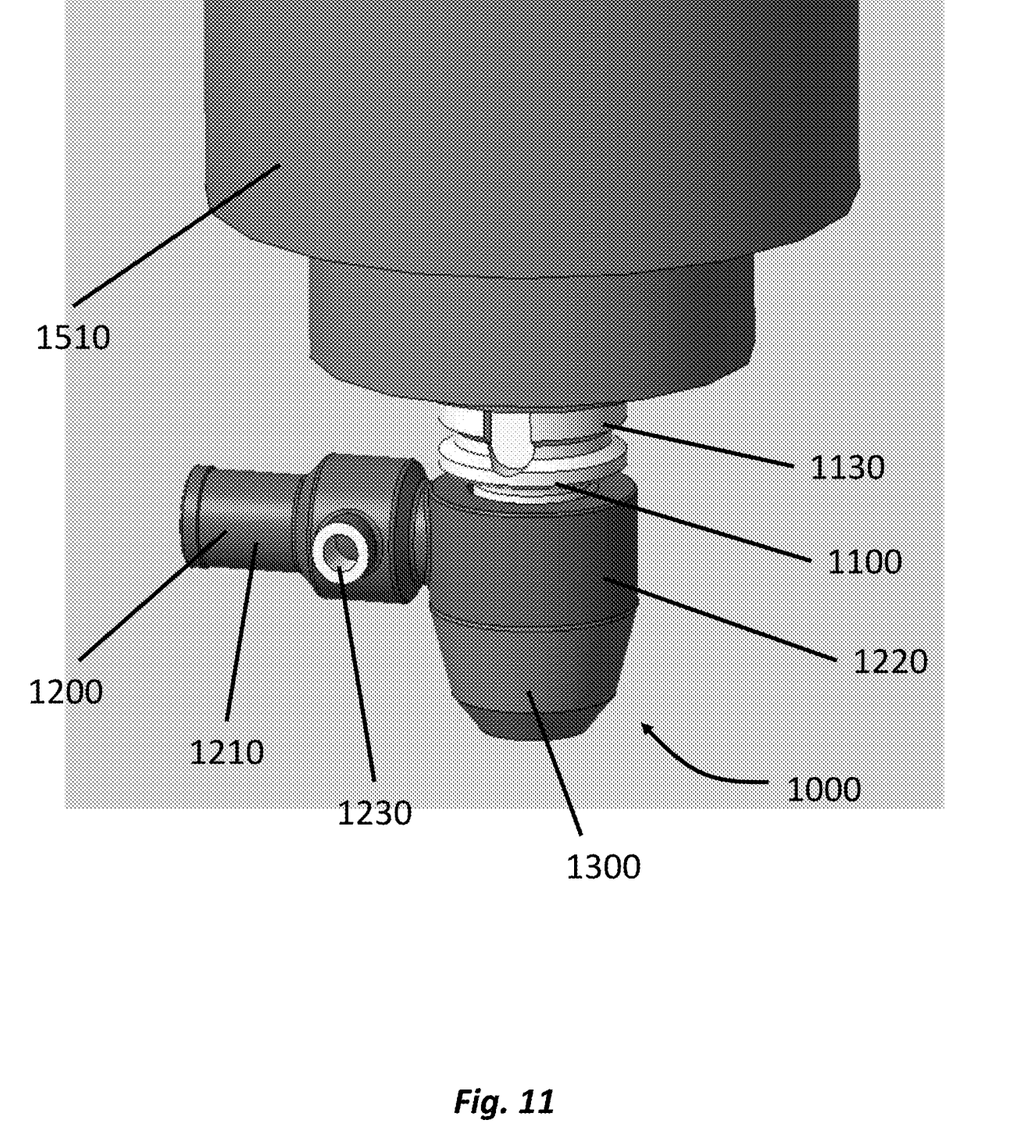
FIG. 11 shows the tool holder assembly of FIG. 8 attached to the spindle of a milling machine.

FIG. 11 is a closer view of the spindle 1510—tool holder assembly 1000 connection.

In use, rotation of the Venturi mechanism and the nozzle section will be prevented by a rotational stop on the milling station to which the tool holder assembly is attached. If so designed, the rotational stop may also facilitate air feed and/or waste removal.

The present invention provides a simplified means for the removal of material waste which does not alter the characteristics of a work piece and/or require a lot of floor space to install.

The present invention also provides a means for adapting existing machining equipment for composite material applications.

The present invention provides a quick and easy solution to retrofit a standard machining machine (i.e. a milling machine, drilling machine, trimming machine etc.) or a standard robotic platform to enable the safe extraction of composite machining dust at the cutting tool tip i.e. the material extraction point.

The device in accordance with the invention is flexible and reconfigurable, facilitating its retrofitting onto any spindle platform for the safe extraction of machining dust. The slender nature of the design of the device allows for restricted access machining while maintaining dust extraction in proximity of the cutting tool tip.

The present invention also comprises no moving parts. As such, large fragments can be extracted without damage to the device in contrast to fans or impellers extractors where large fragments can damage the extractors. In addition, it is easier and cheaper to manufacture than dust extractor attachments which incorporate fans or impellers to assist in the removal of machining dust from the vicinity of the material extraction point.

While the connector portion and the nozzle portion have been described as being releasably connected to the central portion, the invention is not limited thereto. The connector portion and/or the nozzle portion may instead be permanently joined to the central portion.

While the connector portion, central portion, and nozzle portion have been described as being manufactured from a metallic material, other suitable material may be used for the construction of the connector portion, central portion, and/or nozzle portion.

In addition, the connector portion, central portion, and/or nozzle portion may be constructed from a semi-rigid material rather than a rigid material.

While the device has been described with an adapter for connecting the central portion to the nozzle portion, the central portion may incorporate an integrated means for connecting it to the nozzle portion thus doing away with the requirement for an adapter.

While the device has been described as a retro fit to a machine, it can be provided with existing machine. For example, the connector portion could be permanently coupled to the machine or to the tool holder of the machine, and the other components of the device released from the connector portion to effect a cutting tool change before the device is reassembled prior to the commencement of a machining process.

The invention claimed is:

1. A machining machine tool holder assembly comprising:
 a tool holder having a rotational axis, the tool holder comprising a first section having a cavity for receiving a tool therein and a second section configured to connect the tool holder assembly to a spindle of a milling machine;
 a Venturi mechanism coupled to the first section of the tool holder via only a tubular bearing, said Venturi mechanism comprising a tube section, a hollow body section and a compressor airline input; and
 a nozzle section coupled to the Venturi mechanism, the nozzle section having a first end, a second end opposite to the first end, and a circumferential surface extending between the first end and the second end, the nozzle section having a first opening at the first end and a second opening at the second end;
 said Venturi mechanism being in fluid communication with said second opening of the nozzle and is configured to receive compressed air through the compressor airline input to facilitate suction of machining dust through said second opening into the nozzle section and through the Venturi mechanism, the nozzle section is connected to the hollow body section of the Venturi mechanism at the first end of the nozzle section;
 an end of the first section of the tool holder is housed within the nozzle section, and said second opening of the nozzle section is configured to receive a cutting tool therethrough;
 the hollow body section of the Venturi mechanism comprises a base surface extending perpendicular to the rotational axis, an outer substantially cylindrical wall extending axially from the base surface toward the nozzle section, a central through-hole, and an inner cylindrical wall extending axially from the base surface toward the nozzle section and defining the central through-hole, the inner cylindrical wall having an end surface extending perpendicular to the rotational axis;

a gap is formed between the inner cylindrical wall and the outer cylindrical wall;

the tubular bearing has a flange extending perpendicular and radially outward from the rotational axis, the flange is a portion of the tubular bearing closest to the nozzle section;

wherein the inner cylindrical wall is sleeved over, and connected directly to, the tubular bearing, the end surface of the inner cylindrical wall abuts against the flange of the tubular bearing; and wherein the tubular bearing is sleeved over, and connected directly to, the first section of the tool holder.

2. The tool holder assembly according to claim 1, wherein the tool holder assembly is a milling machine tool holder assembly.

3. The tool holder assembly according to claim 1, wherein the tool holder further includes a mounting flange positioned between the first and second sections of the tool holder.

4. The tool holder assembly according to claim 3, wherein the mounting flange further includes a radial groove thereon.

5. The tool holder assembly according to claim 1, wherein the bearing is a high speed bearing.

6. The tool holder assembly according to claim 1, wherein the nozzle section is made from a rigid material.

7. The tool holder assembly according to claim 6, wherein the nozzle section is made from a metallic material.

8. The tool holder assembly according to claim 1, wherein the nozzle section substantially comprises a 3D printable material.

9. The tool holder assembly according to claim 1, wherein the nozzle section is releasably connected to the Venturi mechanism.

10. The tool holder assembly according to claim 9, wherein the nozzle section is releasably snap-fit connected to the Venturi mechanism.

11. The tool holder assembly according to claim 1, wherein the nozzle section is integrally formed with the Venturi mechanism.

12. The tool holder assembly according to claim 1, wherein the nozzle section is substantially dome shaped.

13. The tool holder assembly according to claim 12, wherein the dome shaped nozzle section comprises a first portion and a second portion inclined relative to the first portion.

14. The tool holder assembly according to claim 1, wherein the compressor airline input comprises a hose barb.

15. The tool holder assembly according to claim 1, wherein the nozzle section comprises a portion that is shaped like a conical frustrum which facilitates the creation of a vortex.

* * * * *